US011163966B2

(12) United States Patent
Handshaw et al.

(10) Patent No.: US 11,163,966 B2
(45) Date of Patent: Nov. 2, 2021

(54) SYMBOLOGY READER IMAGING ENGINES AND COMPONENTS ASSOCIATED THEREWITH

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 59 days.

(21) Appl. No.: 16/731,670

(22) Filed: Dec. 31, 2019

(65) Prior Publication Data

US 2021/0203814 A1   Jul. 1, 2021

(51) Int. Cl.
*G06K 7/10*   (2006.01)
*H04N 5/341*   (2011.01)
*H04N 5/225*   (2006.01)

(52) U.S. Cl.
CPC ....... *G06K 7/10881* (2013.01); *H04N 5/2251* (2013.01); *H04N 5/2252* (2013.01); *H04N 5/3415* (2013.01)

(58) Field of Classification Search
CPC ............. G06K 7/10881; H04N 5/2251; H04N 5/3415; H04N 5/2252
See application file for complete search history.

(56) References Cited

U.S. PATENT DOCUMENTS

| | | | |
|---|---|---|---|
| 2012/0126015 A1* | 5/2012 | Wittenberg | G06K 7/10881 235/462.41 |
| 2015/0332076 A1* | 11/2015 | Feng | G06K 7/015 235/454 |
| 2018/0101709 A1* | 4/2018 | Feng | G06K 7/10881 |
| 2019/0042815 A1* | 2/2019 | Stang | G06K 7/10712 |
| 2020/0184159 A1* | 6/2020 | Handshaw | G06K 7/10544 |
| 2021/0182514 A1* | 6/2021 | Handshaw | G06K 7/1413 |

* cited by examiner

*Primary Examiner* — Shahbaz Nazrul
(74) *Attorney, Agent, or Firm* — Yuri Astvatsaturov

(57) ABSTRACT

In an embodiment, the present invention is an imaging engine assembly that includes a housing with a window, an imaging assembly positioned within the housing, the imaging assembly operable to capture image data over a field of view extending through the window and decode an indicium captured in the image data, and a cover positioned at least partially over the housing. The imaging engine housing and the cover are configured such that the cover is alternatively mountable between a first orientation and a diametrically opposed second orientation relative to the housing.

13 Claims, 7 Drawing Sheets

SYMBOLOGY READER IMAGING ENGINES AND COMPONENTS ASSOCIATED THEREWITH

BACKGROUND

While barcode imaging engines are typically found in barcode readers like handheld barcode readers, they can also be integrated as stand-alone devices or installed in kiosks. Due to this versatility, finding the appropriate form factor in combination with user-friendly housing features can be difficult. Moreover, given a relatively small footprint of a barcode imaging engine, appropriate cabling connectivity can also be a challenge.

Accordingly, there exists a need for improved form factors for imaging engines and corresponding components that are configured to work therewith.

SUMMARY

In an embodiment, the present invention is an imaging engine assembly that comprises: a housing having: (i) a first side; (ii) a second side substantially orthogonal to the first side; (iii) a third diametrically opposed to the second side and substantially orthogonal to the first side; (iv) a fourth side extending between the second side and the third side, and substantially orthogonal to the first side; and (v) a fifth side diametrically opposed to the fourth side and substantially orthogonal to the first side; a window positioned in the first side; an imaging assembly positioned within the housing, the imaging assembly operable to capture image data over a field of view extending through the window and decode an indicium captured in the image data; and a cover positioned at least partially over the housing. The imaging engine is configured such that (i) the second side and the third side form a first pair of sides, and the fourth side and the fifth side form a second pair of sides, (ii) at least one of the first pair of sides and the second pair of sides include a first set of alignment features, (iii) the cover includes a second set of alignment features configured to interface with the first set of alignment features such that an interaction between the first set of alignment features and the second set of alignment features locks the cover relative to the housing, and, (iv) the first set of alignment features and the second set of alignment features are arranged such that the cover is alternatively mountable between a first orientation and a diametrically opposed second orientation relative to the housing.

In another embodiment, the present invention is a cover for use with an imaging engine having (i) a housing with a first side, a second side substantially orthogonal to the first side, a third diametrically opposed to the second side and substantially orthogonal to the first side, a fourth side extending between the second side and the third side, and substantially orthogonal to the first side, and a fifth side diametrically opposed to the fourth side and substantially orthogonal to the first side, the second side and the third side forming a first pair of sides, the fourth side and the fifth side forming a second pair of sides, at least one of the first pair of sides and the second pair of sides include a first set of alignment features, (ii) a window positioned in the first side, and an imaging assembly positioned within the housing, the imaging assembly operable to capture image data over a field of view extending through the window and decode an indicium captured in the image data. The cover includes: a first cover wall; a second cover wall extending substantially orthogonally from the first cover wall, and a third cover wall diametrically opposed to the second cover wall and extending substantially orthogonally from the first cover wall; and a second set of alignment features configured to interface with the first set of alignment features such that an interaction between the first set of alignment features and the second set of alignment features locks the cover relative to the housing, wherein the cover lacks a wall diametrically opposite the first wall, and wherein the first set of alignment features and the second set of alignment features are arranged such that the cover is alternatively mountable between a first orientation and a diametrically opposed second orientation relative to the housing.

In still another embodiment, the present invention is a cable tie that includes a head portion; and a strap portion, wherein the head portion includes a trough extending along a trough axis and a loop extending along a loop plane that is substantially parallel to the trough axis, the trough and the loop being connected via an unobstructed passage, the head portion further including an aperture for receiving the strap portion therethrough, and wherein the strap portion extends from the loop opposite the unobstructed passage.

In still yet another embodiment, the present invention is an imaging engine assembly including a housing having: (i) a first side; (ii) a second side substantially orthogonal to the first side; (iii) a third diametrically opposed to the second side and substantially orthogonal to the first side; (iv) a fourth side extending between the second side and the third side, and substantially orthogonal to the first side; (v) a fifth side diametrically opposed to the fourth side and substantially orthogonal to the first side; (vi) a sixth side diametrically opposed to the first side; and (vii) a connector housing portion extending away from the sixth. The imaging engine further includes a window positioned in the first side; an imaging assembly positioned within the housing, the imaging assembly operable to capture image data over a field of view extending through the window and decode an indicium captured in the image data; and a cable tie positioned at least partially around the connector housing portion, wherein the cable tie includes: (i) a head portion; and (ii) a strap portion, wherein the head portion includes a trough extending along a trough axis and a loop extending along a loop plane that is substantially parallel to the trough axis, the trough and the loop being connected via an unobstructed passage, the head portion further including an aperture for receiving the strap portion therethrough, and wherein the strap portion extends from the loop opposite the unobstructed passage.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
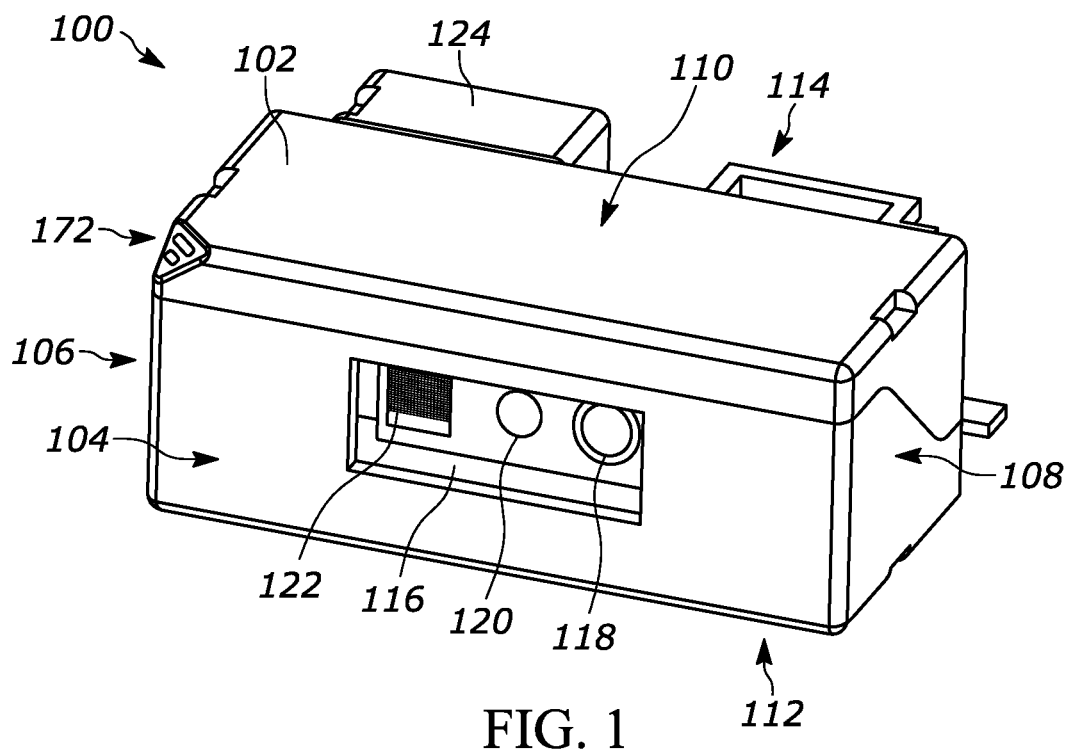
FIGS. 1 and 2 illustrate front-top perspective views of an imaging assembly in accordance with embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring now to FIGS. 1-4, shown therein is an exemplary imaging engine 100 in accordance with at least some embodiments of the present invention. Imaging engine 100 may be implemented in a variety of application, including, but not limited to, handheld barcode readers, kiosks, countertops, and any other application where barcode reading can be desired. Internally, the imaging engine can generally include an imaging sensor with an optical lens assembly configured to focus light onto the imaging sensor over a predetermined field of view (FOV), an aiming assembly configured to produce an aiming pattern indicative of some portion of the FOV (e.g., the center region), an illumination assembly configured to illuminate a target during image capture, a processor operable to control the aforementioned components and to process image data obtained by the image sensor, a memory (which may be a part of the processor) configured to store image data pre and/or post processing, and a decode assembly (which may be a part of the processor) configured to process image data to determine a presence of a decodable indicia (e.g., 1D barcode, 2D barcode, 3D barcode, direct-part-marking code, etc.) and output a result of decoding said indicia. The at least some of the aforementioned components can be mounted appropriately on one or multiple printed circuit boards (PCBs) with cables, ribbon cables, or flexible circuit boards connecting the multiple boards in embodiments where such configuration is implemented. Additionally, one or more chassis components can be used to fixate the position of the PCB(s) and/or the optical lens assembly relative to the rest of the housing. Moreover, a communication and/or a power port (e.g., universal serial bus [USB]) can be provided allowing an external cable to electrically interface with components of the imaging engine.

As illustrated, the imaging engine 100 is encased within a housing 102 having a plurality of sides, which in the present embodiment include a first side 104, a second side 106, a third side 108, a fourth side 110, a fifth side 112, and a sixth side 114. Generally, the first side 104 may be viewed as the front side of the imaging engine 100 where a window 116 is positioned. The window 116 is installed to allow the optical elements like the lens assembly 118, aiming assembly 120, and illumination assembly 122 to have an ingress or exit path to allow light to pass to and from the internal components of the imaging engine. The second side 106 and the third side 108 may be viewed as the left and right sides (when facing the forward side) and are positioned substantially orthogonally to the first side 104. The fourth side 110 and the fifth side 112 may be viewed as the top and bottom sides. Both of these sides extend between the second side 106 and the third side 108, and substantially orthogonally to the first side 104. Additionally, imaging engine 100 includes a sixth side 114 which can be generally viewed as a rear side that extends between the second 106 and third 108 sides and fourth 110 and fifth 112 sides.

Figure 3:
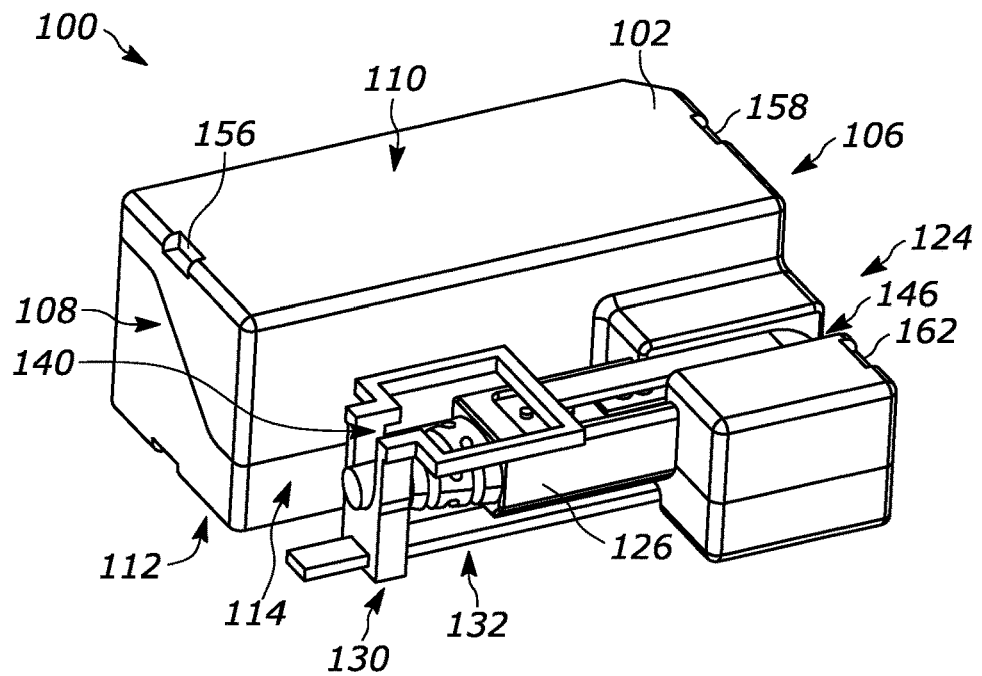
FIG. 3 illustrates a rear-top perspective view of an imaging assembly in accordance with embodiments of the present invention.
Figure 4:
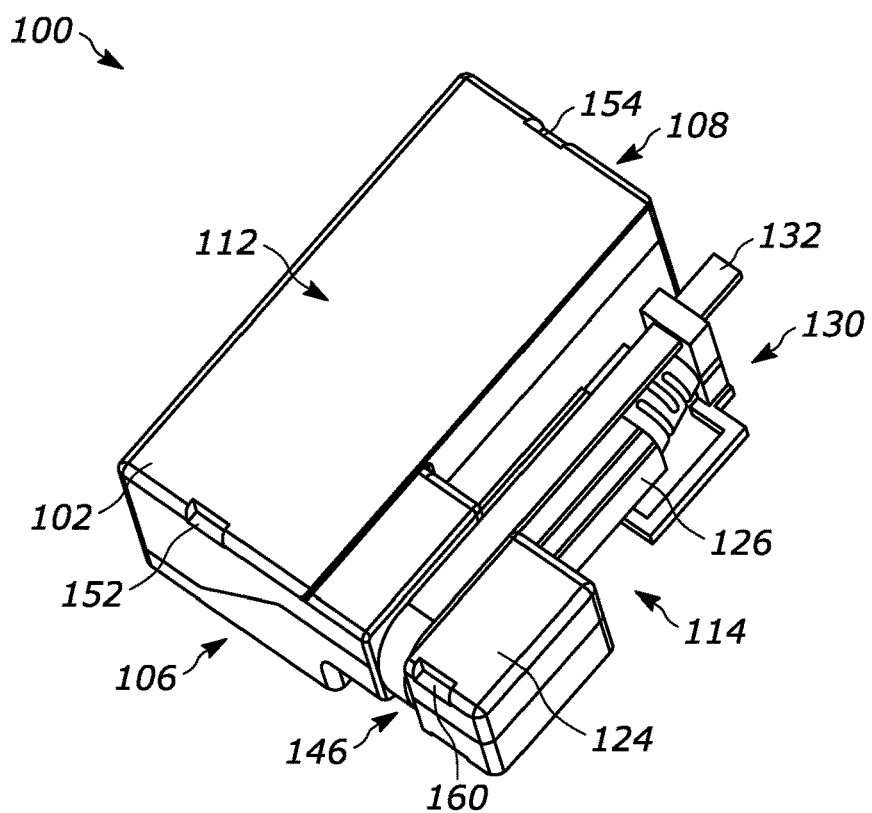
FIG. 4 illustrates a bottom-rear perspective view of an imaging assembly in accordance with embodiments of the present invention.
Figure 5:
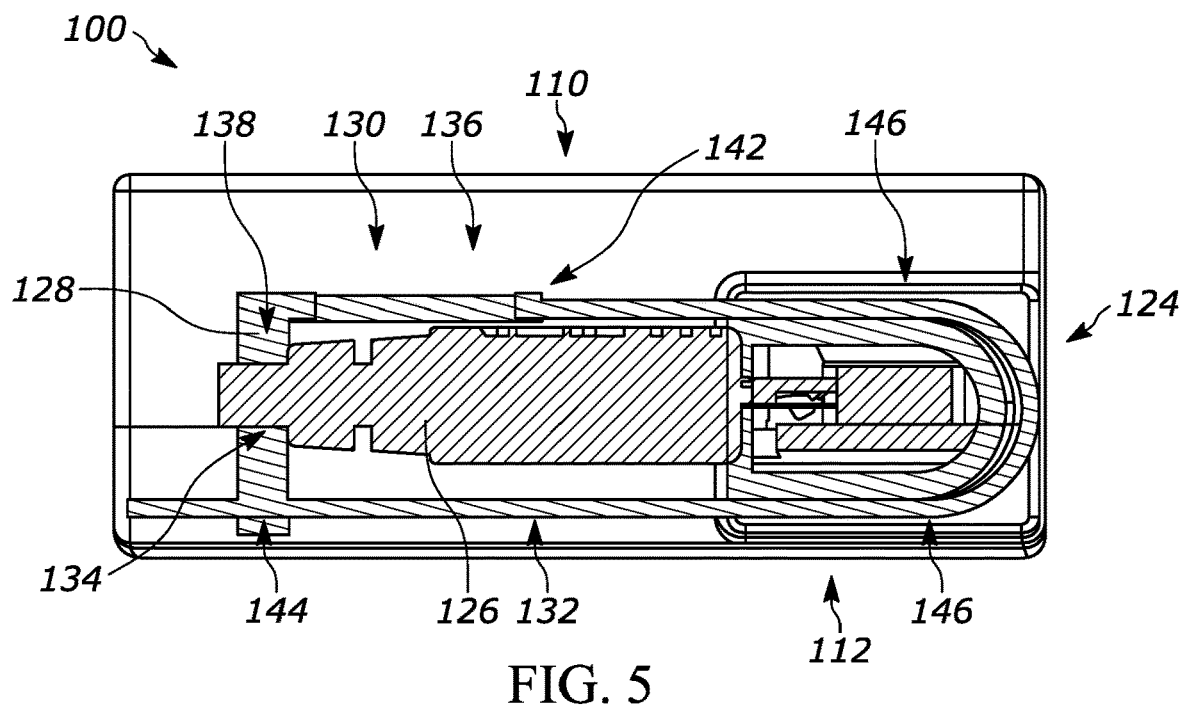
FIG. 5 illustrates a rear cross-section view of an imaging assembly in accordance with embodiments of the present invention.
Figure 6:
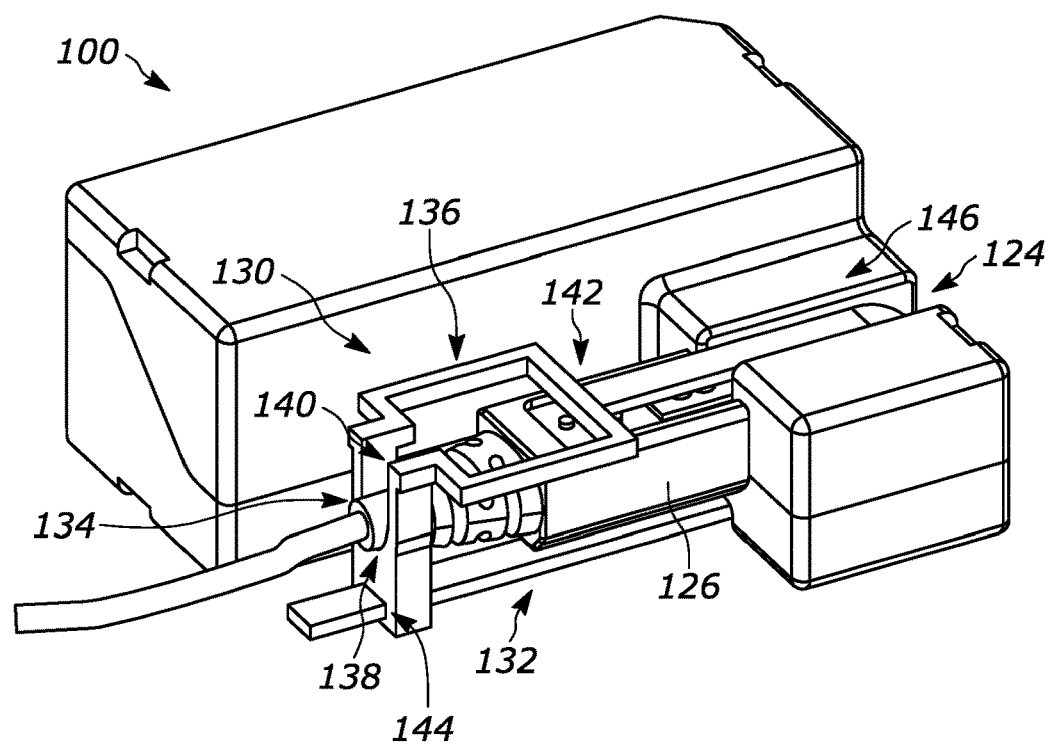
FIGS. 6-9 illustrate an imaging assembly connected with a cable in accordance with embodiments of the present invention.

It should be understood that while in some of the embodiments sides 104-114 can be substantially flat, in other instances these sides may have additional features thereon. These features can include protrusions, notches, seams, bevels, extensions, cutouts, and so on. As an example, the connector housing portion 124 that extends away from the sixth side 114 may be viewed as an exemplary extension. Connector housing portion 124 is an integral part of the housing 102 and is provided to house a connector element (e.g., an RJ45 or a USB jack) to allow a connector 126 of an external cable to connect thereto and thereby interface the internal components of the imaging engine 100. As best seen in FIGS. 3 and 4, in the presently described embodiment, connector housing portion 124 extends away from the sixth side 114 in a rearward direction sufficiently to accommodate a transverse insertion of the connector 126.

To help the connector 126 remain securely attached to the interface of the imaging engine 100, at least some embodiments of the presently described invention can include a cable tie 128. Referring to FIGS. 3-8, cable tie 128 generally includes a head portion 130 and a strap portion 132. To help capture the connector and a part of the cable in place, the head portion 130 includes a trough 134 extending along a trough axis and a loop 136 extending along a loop plane that is substantially parallel to the trough axis. In practice, the user/installer can feed the connector 126 through the loop 130 positioning the rear end of the connector (i.e., the cable end 138 of the connector 126 or the cable itself) with the trough 134. To allow for such threading and positioning, an unobstructed passage 140 is provided between the trough 134 and the loop 136 where in preferred embodiments the connector 126 is wider than the trough and narrower than the loop, and a cable that is connected to the connector 126 is substantially as wide as or narrower than the trough. Additionally, the loop 136 can have a substantially rectangular shape having an inner with, for example, 34 mm or less. Once the connector 126 is threaded through the loop 136, it is mated with the imaging engine 100 and the strap portion 132, which extends from a portion 142 of the loop 136 opposite the unobstructed passage 140, is wrapped around the connector housing portion 124 and back towards the head portion 130 which includes an aperture 144 for receiving the strap portion 132 therethrough. In preferred embodiments the strap portion 132 is constructed of a resilient yet elastic material or compound including, for example, plastic or rubber. Also, in preferred embodiments, the strap portion 132 is constructed from a material that is more elastic that the loop 130. Such construction can help retain the form and the rigidity of the head portion 130 which is preferable for the implementation of at least some embodiments of the present invention.

To secure the connector 126 against the imaging engine 100, the strap portion 132 is threaded through the aperture 144 which includes a securing mechanism (e.g., a ratcheting lip configured to lock against ribs provided in the strap portion) that prevents the strap portion 132 from backing out. Since the connector 126 is wider than the trough 134, tightening the strap portion 132 causes the head portion 130 to advance transversely towards the connector housing portion 124 biasing the connector 126. This coupled with the securing mechanism which prevents the release of the strap portion 132 from the head portion 130 causes the connector 126 to be biased toward the connector housing portion 124 via the trough 134. In some embodiments, the connector housing portion 124 includes one or more grooves 146 configured to guide the strap portion 132 along a predetermined path and prevent unintended displacement when the cable tie 128 is tightened.

Figure 7:
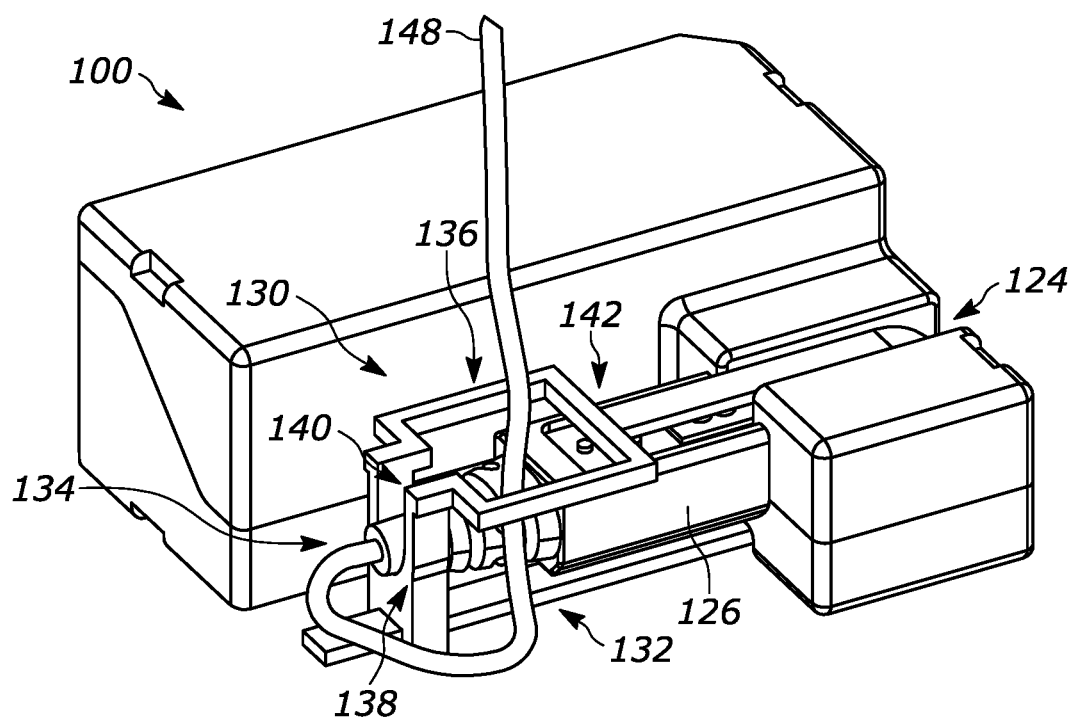
Figure 8:
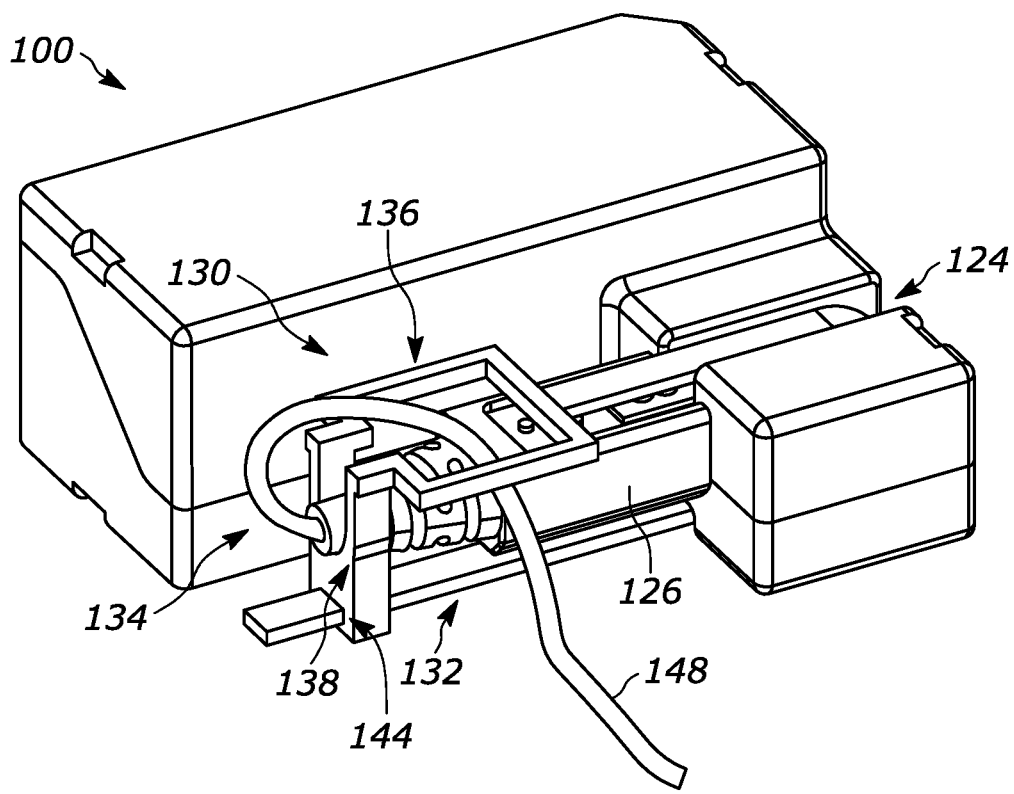
Figure 9:
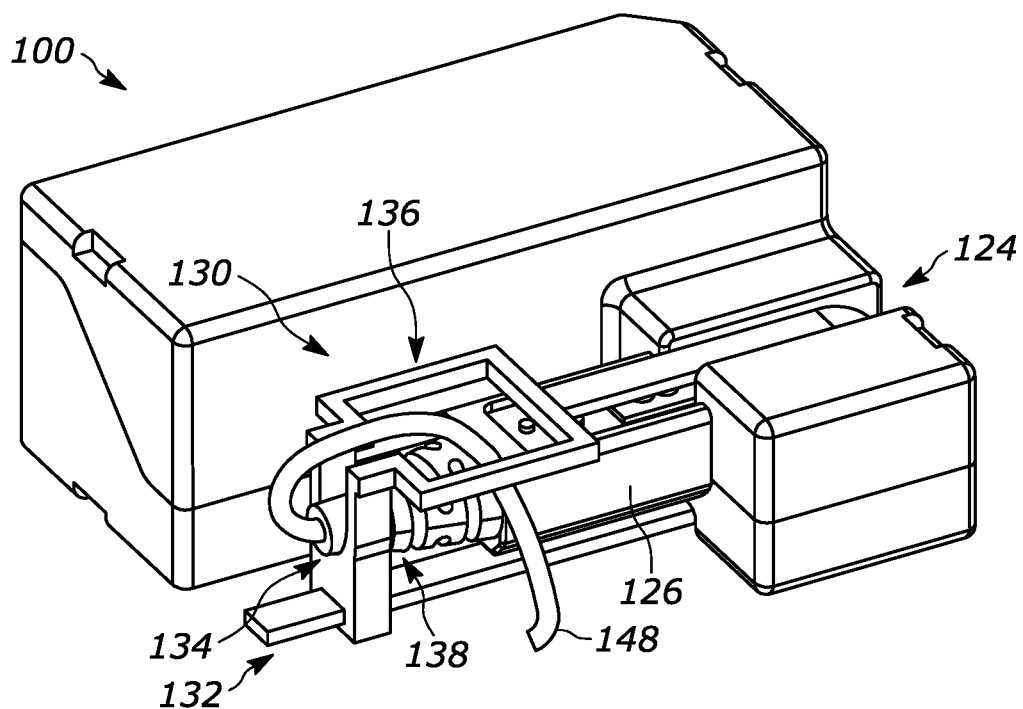
Figure 10:
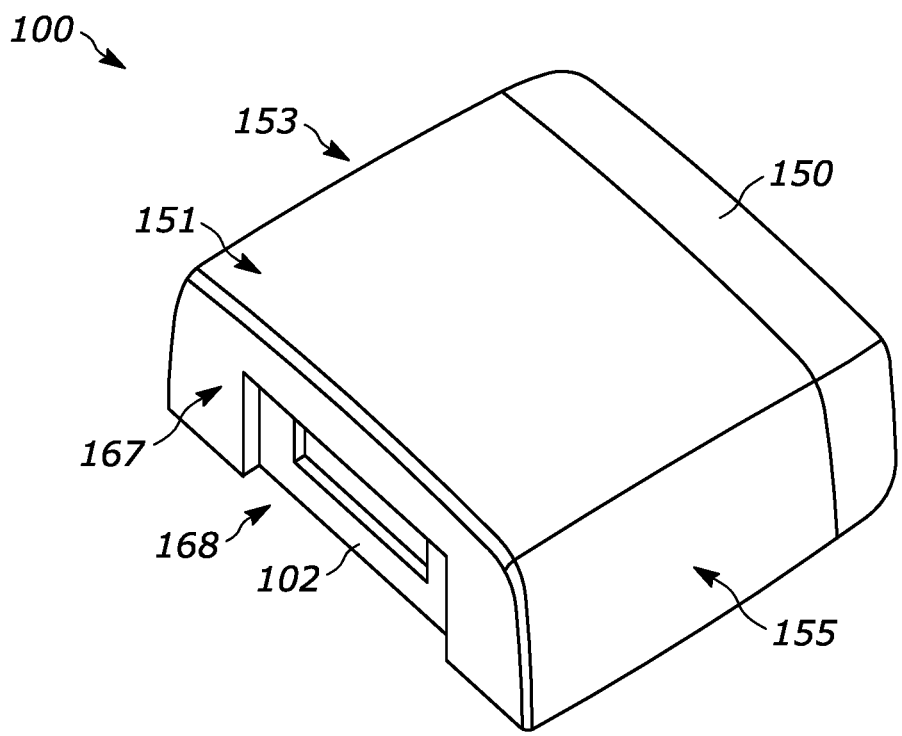
FIGS. 10 and 11 illustrate an embodiment of a cover mounted to an imaging assembly in accordance with embodiments of the present invention.

As shown in FIGS. 7-9, in addition to being particularly advantageous to securing the connector 126 against the imaging engine 100, the cable tie 128 can act as a cable guide by having the cable 148 be threaded through the loop portion 136. This can help provide additional restraint to the cable 148 and connector 126 assembly by directing the cable 148 to its intended direction.

In some embodiments, the imaging engine 100 may incorporate a cover 150 that is positioned over a portion of the housing 102 and that includes a first wall 151, a second wall 153 extending substantially orthogonally from the first wall, and a third wall 155 extending substantially orthogonally from the first wall. To help position the cover 150, both the housing 102 and the cover 150 include corresponding alignment features. Referring to the presently described embodiment and particularly to FIGS. 3, 4, and 11, the housing 102 includes four alignment features (provided in this case as notches) 152, 154, 156, 158. In the current embodiment, each of the alignment features 152, 154, 156, 158 is provided along an edge between two sides. Thus, it may be said that: alignment feature 152 is provided on the second side 106 and/or the fifth side 112; alignment feature 154 is provided on the third side 108 and/or the fifth side 112; alignment feature 156 is provided on the third side 108 and/or the fourth side 110; and alignment feature 158 is provided on the second side 106 and/or the fourth side 110. In other example, though, alignment features may be positioned away from the edges and more towards the center of any one of the sides. Moreover, additional alignment features 160, 162 can be provided on other portions of the housing 102.

To secure the cover 150 on the housing 102 of the imaging engine 100, the alignment features 152, 154, 156, 158 are configured to be interfaced with the corresponding alignment features 164 (positioned at a distal end of the second wall 153 relative to the first wall 151), 166 (positioned at a distal end of the third wall 155 relative to the first wall 151) of the cover 150. In the currently described embodiment, the corresponding alignment features 164, 166 are comprised of protrusions which are formed to be received by the notches 152, 154. When the protrusions 164, 166 are received in the notches 152, 154, the resilient nature of the cover material (which may be made of a rigid but slightly deformable material such as a plastic, synthetic, or composite material) prevents the sides of the cover from widening and thus retains the protrusions 164, 166 locked within the notches 152, 154. This retains the cover 150 in its intended place.

Figure 11:
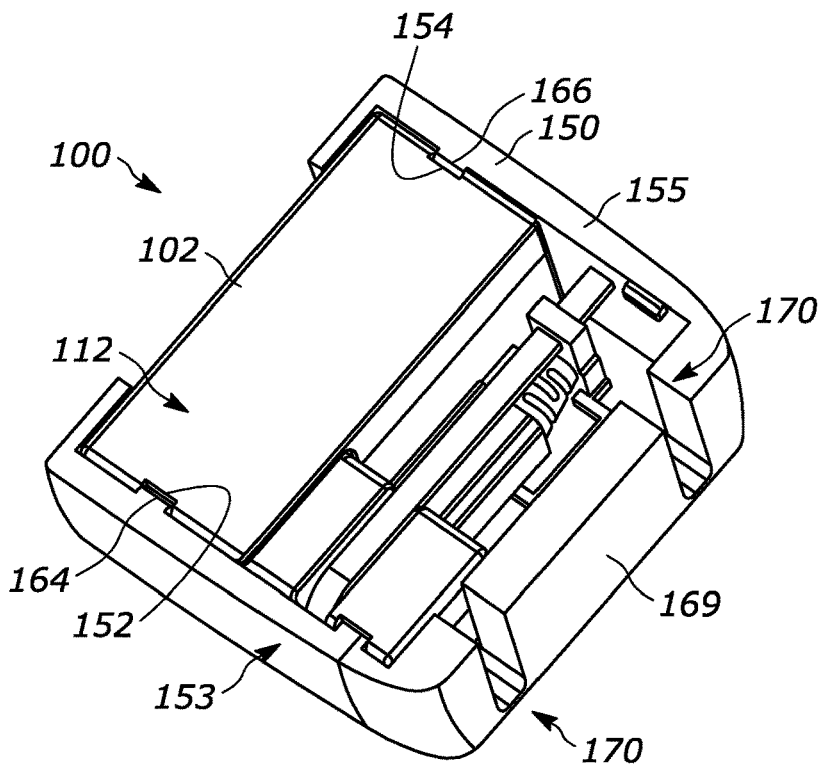
Figure 12:
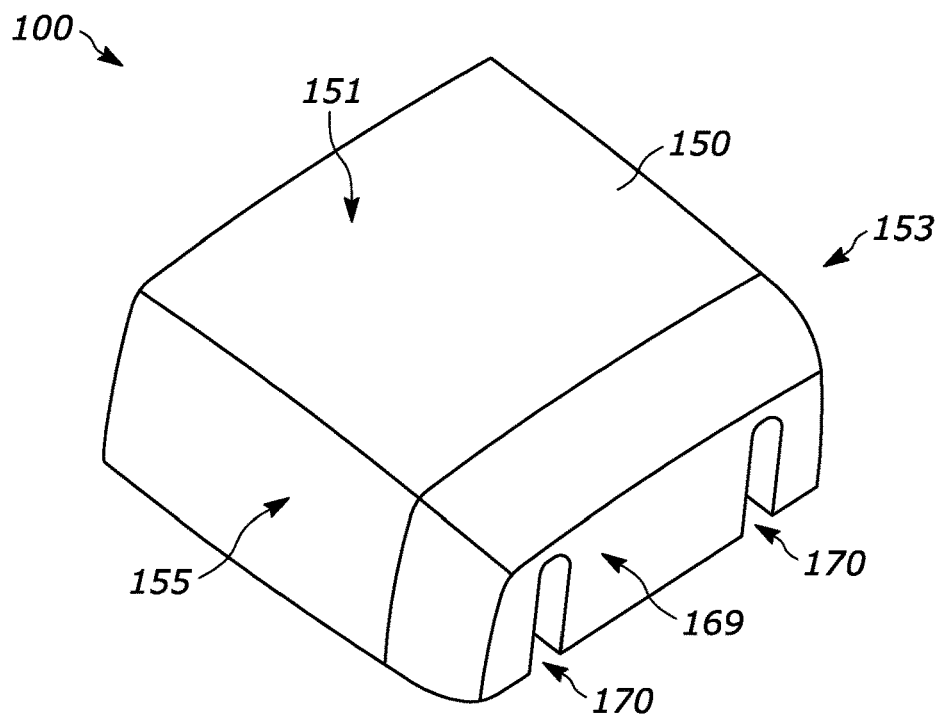
FIG. 12 illustrates an embodiment of the cover of FIGS. 10 and 11.

It should be appreciated that in the case of FIG. 11, only two 152, 154, of the four 152, 154, 156, 158 alignment features are engaged by the corresponding alignment features 164, 166 of the cover 150. This arrangement allows the cover 150 to be alternatively mountable between a first orientation (in this case the orientation shown in FIG. 11 where the fifth side 112 of the housing 102 is left exposed and a diametrically opposed second orientation relative to the housing (not shown). In the second orientation, the corresponding alignment features 164, 166 would engage the alignment features 156, 158 on the housing 102, whereby the cover 150 would cover the fifth side 112 and leave the fourth side 110 exposed. Omitting a cover wall that is diametrically opposite of the first cover wall 151 can enable the imaging engine to be mounted on a variety of surfaces with greater ease.

In at least some embodiments, the cover 150 includes a fourth wall 167 extending between the second cover wall 153 and the third cover wall 155, and a first cutout 168 configured to permit the field of view of the imaging assembly to pass therethrough when the cover 150 is mounted to the housing 102. Also, in some embodiment, the cover 150 includes a fifth cover wall 169 extending between the second cover wall 153 and the third cover wall 155 where the fifth cover wall 155 including at least one second cutout 170 configured to pass a cable (e.g., cable 148) therethrough.

Figure 2:
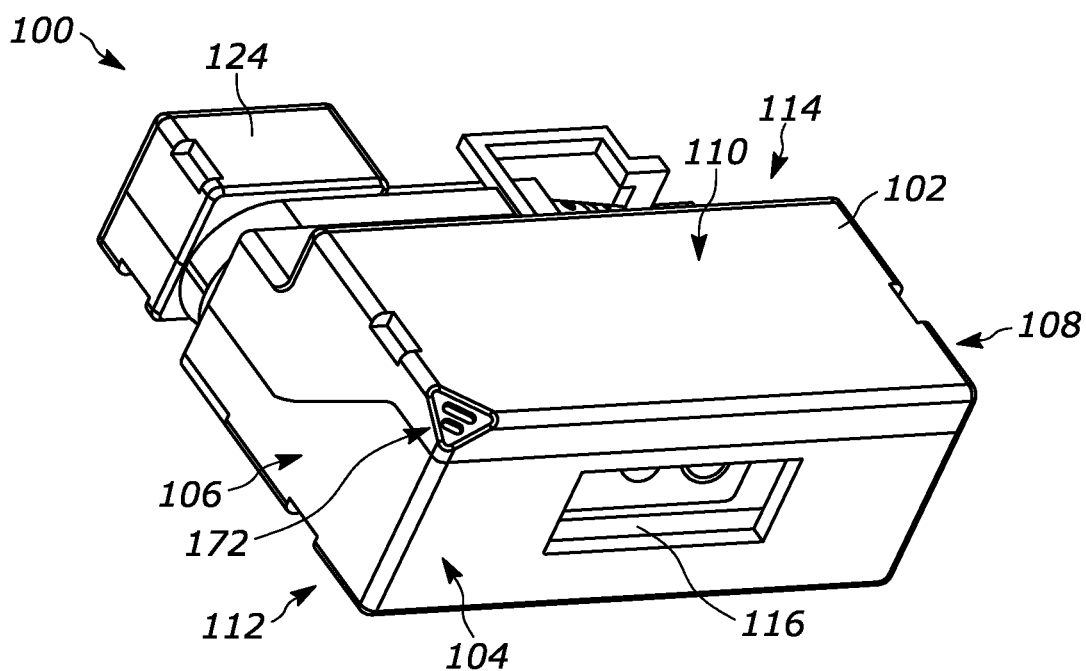

Referring to FIGS. 1 and 2, in some embodiments, the imaging engine described herein can also include an auditory signal device (e.g., a microphone) which is configured to sound an alert (e.g., a beep) upon a successful decoding of an indicia captured by the imaging engine. In a preferred embodiment, this auditory signal device is positioned at a corner 172 of the housing 102 where three sides meet. In case of the currently described embodiment, the sound port is positioned at a meeting point of the first side 104, second side 106, and fourth side 110.

Figure 13:
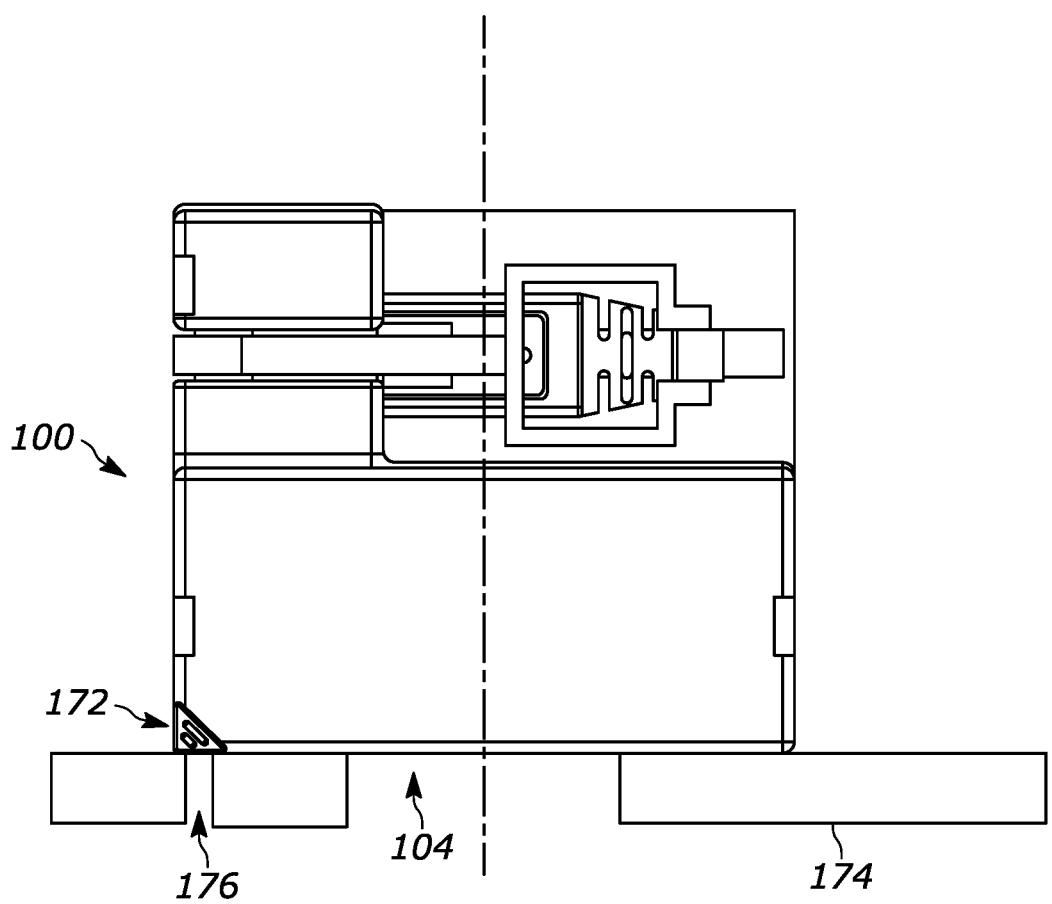
FIG. 13 illustrates a top schematic view of an imaging assembly mounted to a kiosk in accordance with embodiments of the present invention.

By utilizing one of the corners of the front face, it is possible to create an angled surface with respect to the front side and the two adjacent sides, and place the sound port in that surface. This allows the sound to exit regardless of which side is used to mount the imaging engine. Additionally, as shown in FIG. 13, when used in a kiosk 174, the position of the sound port 172 can still remain adjacent to the side (in this case 104) which is used for mounting the imaging engine 100 to the kiosk structure, and thus allow the kiosk to provide a kiosk sound port 176 within close proximity to the imaging engine sound port 172.

Note that while this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

The invention claimed is:

1. An imaging engine assembly, comprising:
 a housing having:
  a first side;
  a second side substantially orthogonal to the first side;

a third diametrically opposed to the second side and substantially orthogonal to the first side;

a fourth side extending between the second side and the third side, and substantially orthogonal to the first side; and a fifth side diametrically opposed to the fourth side and substantially orthogonal to the first side;

a window positioned in the first side;

an imaging assembly positioned within the housing, the imaging assembly operable to capture image data over a field of view extending through the window and decode an indicium captured in the image data; and a cover positioned at least partially over the housing, wherein the second side and the third side form a first pair of sides, and the fourth side and the fifth side form a second pair of sides, wherein at least one of the first pair of sides and the second pair of sides include a first set of alignment features, wherein the cover includes a second set of alignment features configured to interface with the first set of alignment features such that an interaction between the first set of alignment features and the second set of alignment features locks the cover relative to the housing, and wherein the first set of alignment features and the second set of alignment features are arranged such that the cover is alternatively mountable between a first orientation and a diametrically opposed second orientation relative to the housing.

2. The imaging engine assembly of claim 1, wherein the first set of alignment features include one of a set of protrusions or a set of notches, and wherein the second set of alignment features includes another of the set of protrusions or the set of notches.

3. The imaging engine assembly of claim 1, wherein the first pair of sides and the second pair of sides include the first set of alignment features.

4. The imaging engine assembly of claim 3, wherein each of the first set of alignment features includes a respective notch in each of the second side, the third side, the fourth side, and the fifth side.

5. The imaging engine assembly of claim 4, wherein each of the respective notch extends along a respective edge between two of the second side, the third side, the fourth side, and the fifth side.

6. The imaging engine assembly of claim 1, wherein the cover includes first cover wall, a second cover wall extending substantially orthogonally from the first cover wall, and a third cover wall diametrically opposed to the second cover wall and extending substantially orthogonally from the first cover wall, and wherein at least one of the second set of alignment features is positioned at a distal end of the second cover wall relative to the first cover wall, and wherein at least another one of the second set of alignment features is positioned at a distal end of the third cover wall relative to the first cover wall.

7. The imaging engine assembly of claim 1, wherein the cover includes first cover wall, a second cover wall extending substantially orthogonally from the first cover wall, and a third cover wall diametrically opposed to the second cover wall and extending substantially orthogonally from the first cover wall, and wherein the cover lacks a wall diametrically opposite the first wall.

8. The imaging engine assembly of claim 7, wherein the cover further includes a fourth cover wall extending between the second cover wall and the third cover wall, the fourth cover wall including a first cutout configured to permit the field of view to pass therethrough when the cover is mounted to the housing.

9. The imaging engine assembly of claim 8, wherein the cover further includes a fifth cover wall extending between the second cover wall and the third cover wall, the fifth cover wall including a second cutout configured to pass a cable therethrough, the cable connecting the imaging assembly with a power source.

10. A cover for use with an imaging engine having (i) a housing with a first side, a second side substantially orthogonal to the first side, a third diametrically opposed to the second side and substantially orthogonal to the first side, a fourth side extending between the second side and the third side, and substantially orthogonal to the first side, and a fifth side diametrically opposed to the fourth side and substantially orthogonal to the first side, the second side and the third side forming a first pair of sides, the fourth side and the fifth side forming a second pair of sides, at least one of the first pair of sides and the second pair of sides include a first set of alignment features, (ii) a window positioned in the first side, and an imaging assembly positioned within the housing, the imaging assembly operable to capture image data over a field of view extending through the window and decode an indicium captured in the image data, the cover comprising:

a first cover wall;

a second cover wall extending substantially orthogonally from the first cover wall, and a third cover wall diametrically opposed to the second cover wall and extending substantially orthogonally from the first cover wall; and a second set of alignment features configured to interface with the first set of alignment features such that an interaction between the first set of alignment features and the second set of alignment features locks the cover relative to the housing, wherein the cover lacks a wall diametrically opposite the first wall, and wherein the first set of alignment features and the second set of alignment features are arranged such that the cover is alternatively mountable between a first orientation and a diametrically opposed second orientation relative to the housing.

11. The cover of claim 10, further comprising a fourth cover wall extending between the second cover wall and the third cover wall, the fourth cover wall including a first cutout configured to permit the field of view to pass therethrough when the cover is mounted to the housing.

12. The cover of claim 11, further comprising a fifth cover wall extending between the second cover wall and the third cover wall, the fifth cover wall including a second cutout configured to pass a cable therethrough.

13. The cover of claim 10, wherein at least one of the second set of alignment features is positioned at a distal end of the second cover wall relative to the first cover wall, and wherein at least another one of the second set of alignment features is positioned at a distal end of the third cover wall relative to the first cover wall.

* * * * *